July 21, 1931.  W. T. COX  1,815,348
AUTOMATIC BATTERY FILLER
Filed April 15, 1930
Fig. 3.
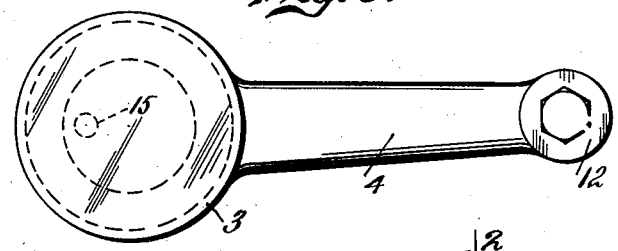
Fig. 1.
Fig. 4.
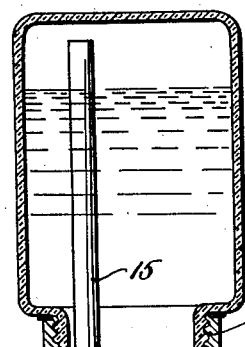
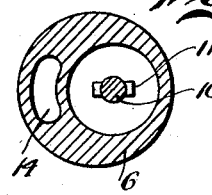
Fig. 2.
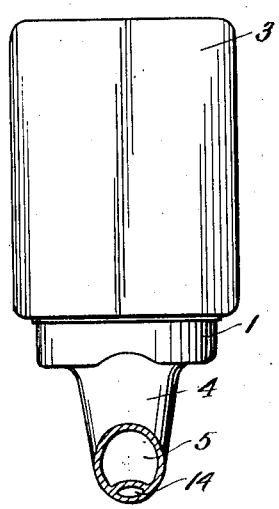
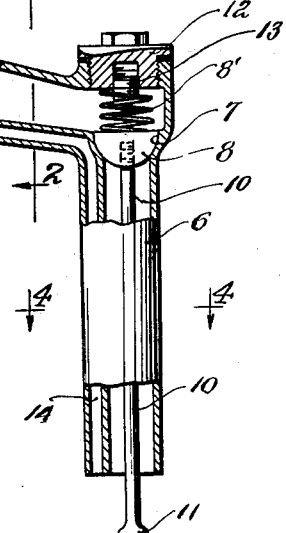
Inventor
Willis T. Cox;
By
Attorney Patented July 21, 1931

1,815,348

UNITED STATES PATENT OFFICE

WILLIS T. COX, OF RIVERA, CALIFORNIA

AUTOMATIC BATTERY FILLER

Application filed April 15, 1930. Serial No. 444,439.

This invention relates to a device for supplying a definite quantity of fluid to containers and it has especial reference to a device for adding water to the cells of storage batteries in which the liquid has become depleted and the plates therein exposed.

The essential objects of this invention are to provide a convenient, simple and inexpensive device of this character by which the filling of battery cells and the shutting off of the flow of the supply water is automatically accomplished; to provide a battery filler by which the cells of difficultly accessible batteries may be readily and quickly supplied with water; and to provide a simple device in which the supply of water to battery cells is automatic, requires no manipulation and hence may be conveniently handled by one hand of the operator.

Other objects will appear from the following specification in connection with the accompanying drawings, which forms a part of this application and which represents a preferred form of embodiment of my invention.

In the drawings,

Fig. 1 is an elevational sectional view showing my invention.

Fig. 2 is a section on line 2—2 of Fig. 1.

Fig. 3 is a plan view and

Fig. 4 is a sectional end view along the line 4—4 of Fig. 1.

The invention consists of a hollow body or conduit arranged for attachment to a suitable container and extending at substantially right angles thereto, the body being provided with a spout which extends at substantially right angles to said body, the passageway in said spout communicating with the passageway in said conduit and arranged to be closed by a valve having an operating stem that is adapted for engagement with one of the plates in a battery cell to unseat the valve and permit water from the container to flow through the spout, means being provided to admit air into the container as the water discharges therefrom and adapted to be sealed by the water in the battery to prevent further flow through the spout.

Referring in particular detail to the form of embodiment expressed by the drawings, 1 designates a hollow body, preferably of acid resisting material, provided with means preferably in the form of internal threads 2 by which the body may be conveniently attached or coupled to a water container 3 which in practice is inverted as shown in Fig. 1 to cause the water therein to flow into the body.

The body 1 is provided or formed with an extension 4 that projects at substantially right angles to said body 1 and is provided with a passageway or duct 5 which communicates with and forms a continuation of the passageway in said hollow body 1. This extension 4 is of a length that will afford ready accessibility to batteries wherever they may be in motor cars, and it is provided or formed at the end thereof with a downwardly directed spout 6, that is disposed substantially at right angles to said extension 4. In the upper end of and within the spout 6 is a seat 7 upon which is normally seated a valve 8 which is held upon its seat and normally closes the bore or passageway 9 in said spout by the pressure of water. The valve 8 is preferably of some heavy material, as lead, to cause it to seat more quickly, such quick seating being additionally aided, if desired by a spring 8', interposed between the top of the valve and the bottom of the plug 12. The valve is provided with a stem 10 which projects beyond the end of the spout 6 and is provided with a head 11 that is designed for engagement with a battery plate and relatively to which stem 10 the spout 6 and its component parts is movable to unseat the valve thereby to permit the water from the reservoir or container 3 to pass therethrough and into the battery cell. The top of the spout is provided with a closure plug 12, which is connected therewith preferably by threaded engagement. This plug 12 carries a centrally disposed stop member 13 which is adjustable relatively to the plug and serves to limit the movement upwardly of the valve, thereby to predetermine the amount of fluid or water that is to be supplied to a battery cell, as explained later.

The spout 6 is formed with a passageway 14, which extends through the extension 4 and into the body 1, the continuation of said passageway to the top of the container and above the fluid level therein being effected by a vertical pipe 15.

In practice, the device is attached to the bottle or other container 3 for the liquid with which the battery is to be filled and the bottle or container is thereupon inverted, such inversion causing the water to force and hold the valve 8 upon its seat and preventing the discharge of any water through the spout 6. In the closed position of the valve, the stem 10 thereof projects beyond the bottom of the spout. The spout is now inserted in a battery opening and the stem 10 is pressed into contact with a battery plate, thereby moving the stem upwardly and unseating the valve 8. Liquid from the container 3 thereupon flows through the spout 6 and continues to flow therethrough and into the battery so long as air is inducted through the passageway 14 and pipe 15. So soon, however as the level of the liquid in the battery closes the inlet to the air passageway 14, the flow of liquid through the spout will cease. The amount of liquid which will be supplied to the battery is determined by the distance of the end of the valve stem 10 from the end of or outlet from the spout 6 and the inlet to the air passageway 14, and this distance may be regulated by adjusting the stop member 13, in the plug 12. When the battery has been supplied with the needed amount of water, the device is removed and the water pressure will immediately cause the valve 8 to seat and check any further flow of liquid through the spout.

What I claim, is:

1. In a device of the character disclosed, a container for a liquid, a hollow body arranged for attachment to said container, and extending at substantially right angles thereto, a downwardly directed spout connected with said body and provided with a seat, a valve operable relatively to said seat to open or close the passageway therein, a stem on said valve and extending beyond the outlet from said spout, and yielding means to hold and force said valve upon its seat, said spout and body provided with a passageway for admitting air to the top of the container as the liquid therein discharges therefrom.

2. In a device of the character disclosed, a container for a liquid, a hollow body arranged for attachment to said container and extending at substantially right agles thereto, said body having a downwardly directed spout, the passageway of which communicates with the passageway in said body, a valve in said spout to open or close communication between the passageways in said body and spout, a stem connected to said valve and extending beyond the outlet end of said spout, a removable closure for the top of said spout, and an adjustable means carried by said closure to regulate the movement thereof and thereby predetermine the quantity of fluid that shall be discharged from said container, said spout and body provided with a passageway for leading air into the top of said container during the discharge of the liquid therefrom.

In testimony whereof I have set my hand.

WILLIS T. COX.